No. 12,482.

REISSUED MAY 15, 1906.

G. W. DU BES.

LOCKING AND RELEASING MECHANISM FOR STANDARDS OF LOGGING CARS.

APPLICATION FILED MAR. 26, 1906.

3 SHEETS—SHEET 1.

Witnesses,
Geo. H. Payne
Samuel Turley

Inventor
George W. DuBes,
by Williamson & Fisher,
Attorneys.

ANDREW B. GRAHAM CO., PHOTO-LITHOGRAPHERS, WASHINGTON, D. C.

No. 12,482. REISSUED MAY 15, 1906.
G. W. DU BES.
LOCKING AND RELEASING MECHANISM FOR STANDARDS OF LOGGING CARS.
APPLICATION FILED MAR. 26, 1906.
3 SHEETS—SHEET 2.
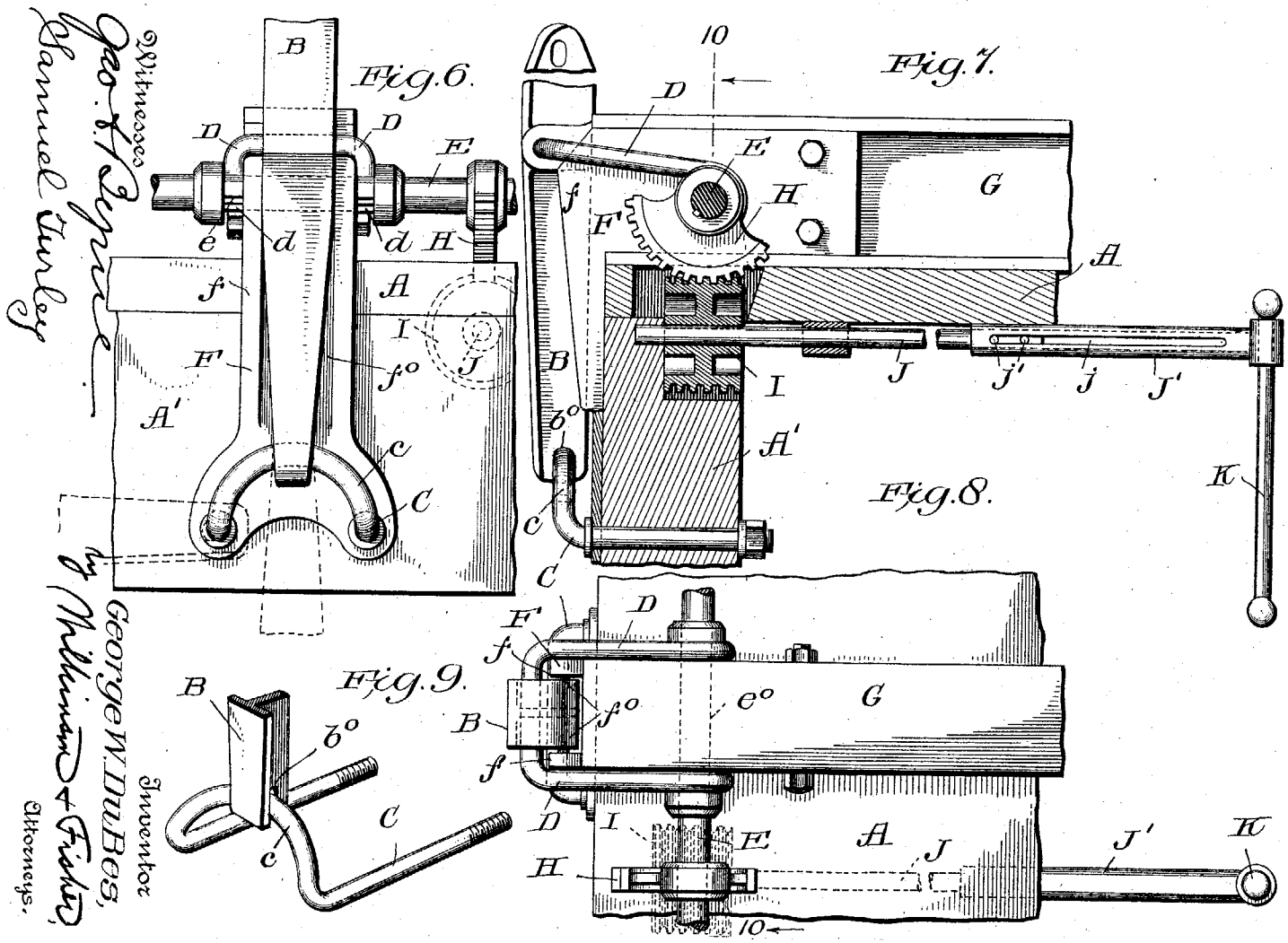
ANDREW B. GRAHAM CO., PHOTO-LITHOGRAPHERS, WASHINGTON, D. C.

No. 12,482. REISSUED MAY 15, 1906.

G. W. DU BES.

LOCKING AND RELEASING MECHANISM FOR STANDARDS OF LOGGING CARS.

APPLICATION FILED MAR. 26, 1906.

3 SHEETS—SHEET 3.

Witnesses
Geo. T. Payne.
Samuel Turley

Inventor
George W. DuBes,
by Wilkinson & Fisher,
Attorneys.

UNITED STATES PATENT OFFICE.

GEORGE W. DU BES, OF NEW ORLEANS, LOUISIANA.

LOCKING AND RELEASING MECHANISM FOR STANDARDS OF LOGGING-CARS.

No. 12,482. Specification of Reissued Letters Patent. Reissued May 15, 1906.

Original No. 808,733, dated January 2, 1906. Application for reissue filed March 26, 1906. Serial No. 308,193.

*To all whom it may concern:*

Be it known that I, GEORGE W. DU BES, a citizen of the United States, and a resident of New Orleans, in the parish of Orleans and State of Louisiana, have made certain new and useful Improvements in Locking and Releasing Mechanism for Standards of Logging-Cars, of which the following is a specification.

My invention relates to improvements in standards for use on cars, carts, or other vehicles and in the apparatus for operating said standards, whereby the standard may be firmly and securely held in the upright position or in the position requisite for holding the load in place and in which a series of said standards may be simultaneously released from a position of safety for the operator, and, furthermore, in which the standards may be held out of the way when disengaged, which will not interfere with the loading of the car or other vehicle, and will not expose the standard to injury when not in use while the car is in motion.

Figure 1:
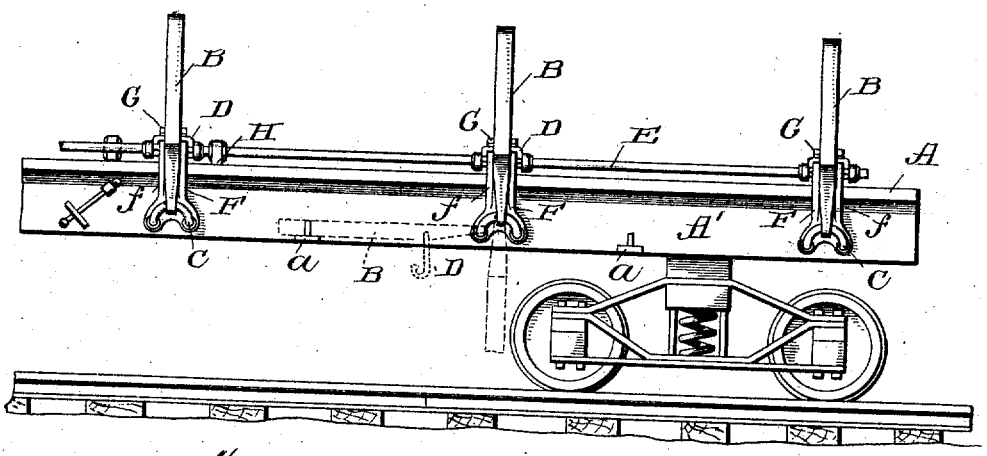
Figure 2:
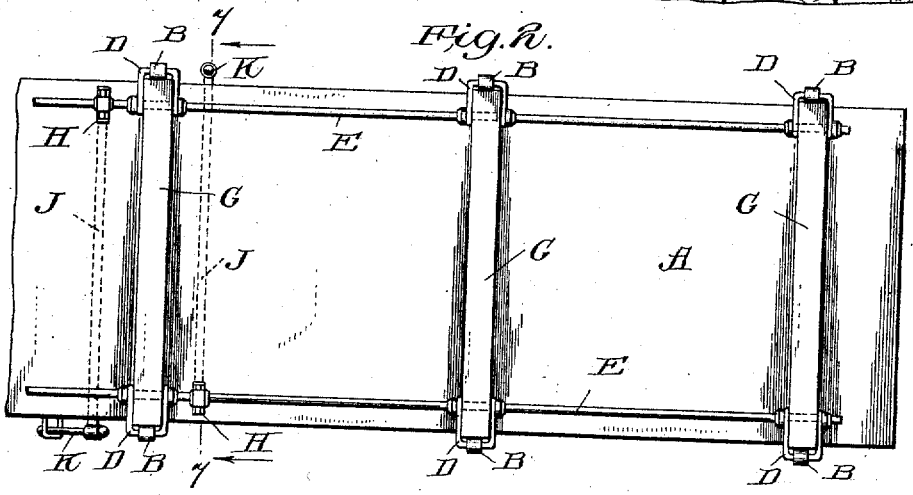
Figure 3:
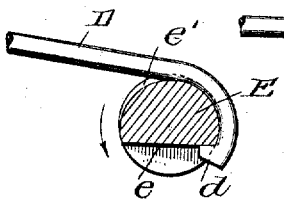
Figure 4:
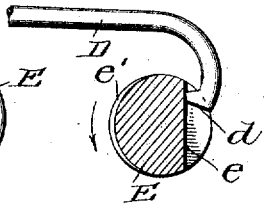
Figure 5:
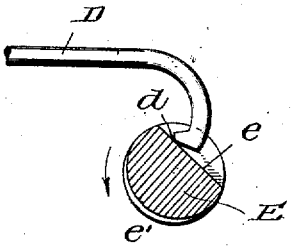
Figure 10:
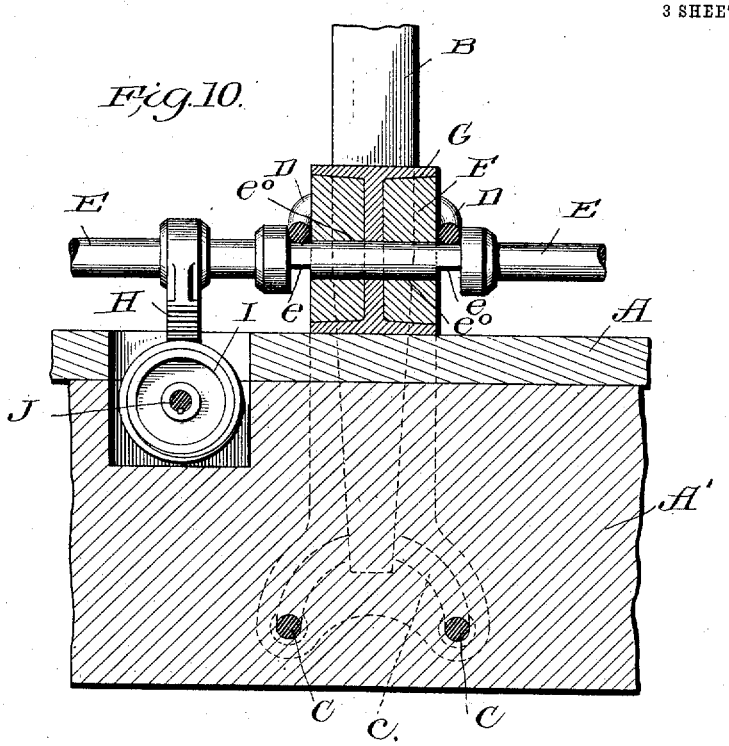
Figure 11:
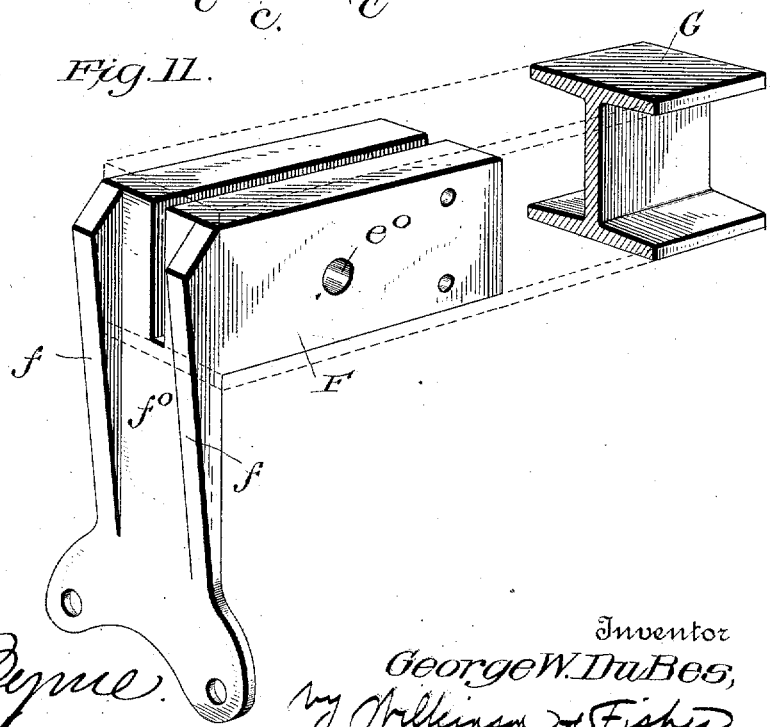

Figure 1 is a side view of a logging-car provided with my invention. Fig. 2 is a plan view of the same. Figs. 3, 4, and 5 are detail views illustrating the engagement and release of hooks connected with the pivoted standards. Fig. 6 is an enlarged side view of a standard and adjacent portions and the locking and releasing mechanism. Fig. 7 is an enlarged vertical section on the line 7 7 of Fig. 2 and looking in the direction of the arrows. Fig. 8 is an enlarged plan view of a standard and other connected parts, the standard being shown locked, as in Figs. 6 and 7. Fig. 9 is a perspective view illustrating the hinge or pivot of the standards and the connection of the latter therewith. Fig. 10 shows a section, on an enlarged scale, along the line 10 10 of Figs. 7 and 8 and looking in the direction of the arrows, parts being shown in elevation; and Fig. 11 shows a perspective view, on a still further enlarged scale, of one of the corner-blocks and the "bunk" adapted to be connected thereto, parts being broken away.

A indicates the floor or platform of a logging-car, A′ one of the sills, and B the standards thereof, to which my improved releasing attachment is applied. The standards are arranged as usual on opposite sides of the floor A, as shown in Fig. 2. They are hinged (see Figs. 6, 7, and 9) to the upturned and curved ends *c* of U-shaped bolts C, whose legs pass through the car-sill A′ and are secured by nuts and collars, as shown in Fig. 7. It will be seen that this connection and arrangement of parts permits the standards B to turn directly outward when released and also to turn downward alongside the sill A′ to a horizontal position (indicated by dotted lines, Fig. 7) in which it is supported by any suitable device *a*, secured to and projecting from the car-sill A′.

The standards B are held in the normal vertical or working position by means of clevis-shape hooks D, which are hinged thereto at their middle, their inner or free ends being curved downward and formed as hooks proper, *d*. (See Figs. 3 to 5.) The hooks engage cut-away portions *e* and *e′* of rotatable shafts E, which are arranged over the floor A of the car adjacent and parallel to the side edges (see Fig. 2) of the floor A. The said shafts have their bearings $e^{\circ}$ in the castings or iron blocks F, that are tied together by the beams or bunks G, extending across the car-floor A. These bunks extend across the car above the platform A and form supports for the logs or lumber which is piled lengthwise on the car. The standard B is supported at its heel by the bolt C engaging in the elongated slot $b^{\circ}$, (see Fig. 9,) and it is firmly held in the groove $f^{\circ}$ between the ribs of the block F by the hook D, so that the standard when in the raised position is firmly held in place against either swinging outward or lateral play. It will be seen that the bolt C, with its collars, also serves to secure the heel of the block F to the sill A′ of the car. On each shaft E is keyed a segmental gear H, (see Fig. 7, ) which engages a worm I, keyed upon a rotary shaft J, which is arranged transversely beneath the floor A of the car and supported in suitable bearings. A sliding extension J′ of said shaft is connected with it, the same being hollow and provided with one or more slots *j*, that receive lateral pins *j′* on the shaft J. The outer end of the tubular extension J′ is provided with a slidable handle K, the same being held in an eye or cuff on the end of the extension and adapted to slide therein like the handle of a vise.

In Figs. 3, 7, and 8 the hooks D are shown engaged with the shafts E in the manner represented in Fig. 3, whereby the standards B are held firmly in the vertical or working position. It will be understood that since there is practically no slip between the segment H and the worm I the segment is locked in any position to which it may be rotated, and therefore it holds the hooks and standards in the working position without the aid of any supplemental device. When, however, it is desired to release the standards for the purpose of unloading the car, the operator standing on the opposite side of the car from that on which the unlocking is to be effected draws out the shaft extension J′ until the handle K may be freely rotated, which being done in the required direction the segment H is rotated, so that it successively assumes the positions indicated in Figs. 4 and 5—that is to say, in the position shown in Fig. 3 the hooks are engaged with the flat portions *e* of the shafts E, and therefore, as before stated, the standards are held rigidly in the vertical position; but when the shaft E is rotated in the direction of the arrow, as shown in Figs. 4 and 5, the flat side assumes such an angle to the hook proper that the hook slides off and becomes disengaged from the shaft. Upon such disengagement the standards fall outwardly, so as to release the load on that side.

Two shafts E and counter-shafts J are shown for operating the standards on the respectively opposite sides of the car. It will be understood that the required operation of the segment is effected with great ease or with the application of slight manual force and with entire safety, since the operator stands on the side of the car opposite that where the release is to be effected. It will be further understood that the same operation is performed when it is desired to lower the standards into the horizontal position. (Indicated by dotted lines in Fig. 1.) When the handle K is not required for use, the slidable shaft extension J′ is pushed inward until the handle is close to the side of the car, when it may be inserted and held in a clasp *a* or any other suitable device secured to the sill of the car.

It will be seen that I provide a very strong and durable structure in which the standards when in use are securely held in grooves in stout metal blocks or castings, but in which the standards may be readily released and supported out of the way below the car-platform. Furthermore, it will be seen that the cross-beams G tie the blocks on opposite sides of the car together, and thus add strength to the car, as well as securely holding the blocks against being torn off from the car by the outward pressure of the load acting on the standards as levers.

The herein-described apparatus has few, if any, parts likely to get out of order and is eminently adapted to the rough usage and heavy strains to which such apparatus is liable to be subjected.

Having thus described my invention, what I claim as new, and desire to secure by Letters Patent of the United States, is—

1. The combination with a car-body, of standards hinged on the sides of the same and provided with pivoted hooks adapted to extend inward, a rotary shaft arranged in bearings parallel to the side of the car and adapted for engagement with said hooks, gears fixed to said shaft, a transverse shaft having a worm which engages such gear and is adapted to rotate or lock the same, and means for rotating the transverse shaft, substantially as described.

2. The combination with the car-body, of standards pivoted on the sides of the same, hooks hinged to the standards and adapted to extend inward therefrom, a shaft arranged parallel to the side edge of the car adjacent to the standards and provided with flattened portions with which the hooks are adapted to engage, a segmental gear keyed on the shaft, a worm engaging the segments, and a transverse shaft on which the worm is keyed, the same having a slidable extension provided with a handle, substantially as described.

3. The combination with a car-body, standards pivoted on the sides of the same, hooks pivoted to the standards and a shaft arranged along the edge of the car-body and provided with a gear, of means for operating and locking the latter consisting of a worm and a shaft on which the same is mounted, the shaft extending transversely beneath the car, a sliding tubular shaft applied to the worm-shaft, and a slidable handle applied to the outer end of the tubular extension, substantially as described.

4. The combination with a car-body of devices attached to the side thereof, and consisting of U-bolts having the curved central portion bent upward, standards mounted loosely on such curved portions, and means for locking and releasing the standards, substantially as described.

5. The combination with the car-body and standards therefor, of supports for the standards having curved portions arranged parallel to the side of the car, and the convex side of the curve being uppermost, and means for locking and releasing the standards, substantially as described.

6. An apparatus for maintaining and releasing loads on cars or carts, or other vehicles, comprising a series of blocks secured to the vehicle-body, a series of rigid standards pivoted below said blocks, means for locking each standard to the corresponding block, and means for simultaneously unlocking and releasing a plurality of said standards, substantially as described.

7. An apparatus for maintaining and releasing loads on cars or carts, or other vehicles, comprising a series of blocks secured to the vehicle-body, and provided with outwardly-disposed holding-grooves, a series of rigid standards adapted to swing into engagement in said grooves, means for hinging said standards below said blocks, means for holding the standards in engagement with said grooves, and means for simultaneously releasing a plurality of said standards.

8. An apparatus for maintaining and releasing loads on cars or carts, or other vehicles, comprising a series of metallic blocks provided with vertical grooves and secured to the vehicle-body, a series of rigid metal standards adapted to swing into engagement in said grooves, means for hinging said standards below said blocks, means for holding the standard in engagement with said grooves in the blocks, and means for simultaneously releasing a plurality of said standards.

9. An apparatus for maintaining and releasing loads on cars or carts, or other vehicles, comprising a series of blocks provided with vertical grooves secured to the vehicle-body, a series of rigid standards adapted to engage in said grooves, means for hinging said standards below said blocks, means for holding the standards in engagement with said grooves in the blocks, and means operable from another side of the vehicle for simultaneously releasing a plurality of said standards, substantially as described.

10. An apparatus for maintaining and releasing loads on cars or carts, or other vehicles, comprising a series of blocks provided with vertical grooves secured to the vehicle-body, a series of rigid standards adapted to engage in said grooves, means for hinging said standards below said blocks, means for holding the standards in engagement with said grooves in the blocks, and means for simultaneously releasing a plurality of said standards, with means located beneath the platform of the vehicle for supporting the free end of the standard when released, substantially as described.

11. An apparatus for maintaining and releasing loads on cars or carts, or other vehicles, comprising a series of blocks provided with vertical grooves secured to the vehicle-body, a series of rigid standards adapted to engage in said grooves, means for hinging said standards below said blocks, means for holding the standard in engagement with said grooves in the blocks, and means operable from another side of the vehicle for simultaneously releasing a plurality of said standards, with means located beneath the platform of the vehicle for supporting the free end of the standard when released, substantially as described.

12. An apparatus for maintaining and releasing loads on cars or carts, or other vehicles, comprising a series of metal blocks provided with vertical grooves and secured to the vehicle-body, a series of rigid ribbed metal standards adapted to engage closely in said grooves, means for hinging said standards below said blocks to enable the standard to swing outward and laterally, means for holding the standards in engagement with said grooves in the blocks, and means for simultaneously releasing a plurality of said standards.

13. An apparatus for maintaining and releasing loads on cars or carts, or other vehicles, comprising a series of metal blocks provided with vertical grooves and secured to the vehicle-body, a series of ribbed metal standards adapted to engage closely in said grooves, means for hinging said standards below said blocks to enable the standard to swing outward and laterally, means for holding the standards in engagement with said grooves in the blocks, and means operable from another side of the vehicle for simultaneously releasing a plurality of said standards, substantially as described.

14. An apparatus for maintaining and releasing loads on cars or carts, or other vehicles, comprising a series of metal blocks provided with vertical grooves secured to the vehicle-body, a series of rigid ribbed metal standards adapted to engage in said grooves, means for hinging said standards below said blocks to enable the standard to swing outward and laterally, means for holding the standards in engagement with said grooves in the blocks, and means for simultaneously releasing a plurality of said standards, with means located beneath the platform of the vehicle for supporting the free end of the standard when released, substantially as described.

15. An apparatus for maintaining and releasing loads on cars or carts, or other vehicles, comprising a series of blocks provided with vertical grooves secured to the vehicle-body, a series of standards adapted to engage in said grooves, means for hinging said standards below said blocks, hooks pivoted to said standards for holding the standards in engagement with said grooves in the blocks, and means operable from another side of the vehicle for simultaneously releasing a plurality of said hooks and the standards held thereby, substantially as described.

16. An apparatus for maintaining and releasing loads on cars or carts, or other vehicles, comprising a series of blocks provided with vertical grooves secured to the vehicle-body, a series of standards adapted to engage in said grooves, means for hinging said standards below said blocks to enable the standard to swing outward and laterally, hooks pivoted to said standards for holding the standards in engagement with said grooves in the blocks, and a notched rod engaging a series of said hooks and adapted when rotated to simultaneously release a plurality of said hooks and the standards held thereby, substantially as described.

17. An apparatus for maintaining and releasing loads on cars or carts, or other vehicles, comprising a series of metal blocks provided with vertical grooves secured to the vehicle-body, a series of rigid metal standards adapted to engage in said grooves, hooks pivoted to said standards and holding said standards in said grooves, the said standards being perforated near their lower ends, a series of substantially U-shaped bolts secured to the vehicle-body, and each passing through the perforation in a standard, and means for simultaneously releasing a plurality of said standards and allowing them to swing about said U-shaped bolts, substantially as described.

18. An apparatus for maintaining and releasing loads on cars or carts, or other vehicles, comprising a series of metal blocks provided with vertical grooves secured to the vehicle-body, a series of metal standards adapted to engage in said grooves, hooks pivoted to said standards and holding said standards in said grooves, the said standards being perforated near their lower ends, a series of substantially U-shaped bolts secured to the vehicle-body, and each passing through the perforation in a standard, and a rotatable notched rod for releasing said hooks, thus simultaneously releasing a plurality of said standards and allowing them to swing about said U-shaped bolts, substantially as described.

19. An apparatus for maintaining and releasing loads on cars or carts, or other vehicles, comprising a series of metal blocks provided with vertical grooves secured to the vehicle-body, a series of rigid metal standards adapted to engage in said grooves, the said standards being perforated near the lower ends, a series of substantially U-shaped bolts secured to the vehicle-body, and each passing through the perforation in a standard, and means for simultaneously releasing a plurality of said standards and allowing them to swing about said U-shaped bolts, with means located below the platform of the vehicle-body for supporting the free ends of said standards, substantially as described.

20. An apparatus for maintaining and releasing loads on cars or carts, or other vehicles, comprising a series of metal blocks provided with vertical grooves secured to the vehicle-body, a series of metal standards adapted to engage in said grooves, the said standards being perforated near their lower ends, hooks pivoted to said standards, a series of substantially U-shaped bolts secured to the vehicle-body, and each passing through the perforation in a standard, and a notched rod operable from another side of the car for releasing said hooks, thus simultaneously releasing a plurality of said standards and allowing them to swing about said U-shaped bolts, substantially as described.

21. An apparatus for maintaining and releasing loads on cars or carts, or other vehicles, comprising a series of blocks secured to the vehicle-body, and each provided with an outwardly-disposed holding-groove, a series of rigid standards each pivoted below said blocks and each adapted to engage in one of said grooves, means for holding the standards in engagement with said grooves in the blocks, and means for simultaneously releasing a plurality of said standards, whereby the said standards are allowed to swing outward about their pivots, substantially as described.

22. An apparatus for maintaining and releasing loads on cars or carts, or other vehicles, comprising a series of blocks secured to the vehicle-body, and each provided with an outwardly-disposed holding-groove, a series of standards each adapted to be swung upward into engagement in one of said grooves, means for hinging said standards below said blocks to enable the standard to swing outward and downward and laterally, means for holding the standards in engagement with said grooves in the blocks, and means operable from another side of the vehicle for simultaneously releasing a plurality of said standards, substantially as described.

23. An apparatus for maintaining and releasing loads on cars or carts, or other vehicles, comprising a series of blocks secured to the vehicle-body, and each provided with an outwardly-disposed holding-groove, a series of standards each adapted to be swung upward into engagement in one of said grooves, means for hinging said standards below said blocks, a hook pivoted to each of said standards at a distance from the pivot of said standard for holding the standard in engagement with said grooves in the blocks, and means operable from another side of the vehicle for simultaneously releasing a plurality of said hooks, thereby allowing said standards to swing outward, substantially as described.

24. An apparatus for maintaining and releasing loads on cars or carts, or other vehicles, comprising a series of blocks secured to the vehicle-body, and each provided with an outwardly-disposed holding-groove, a series of standards each adapted to be swung upward into engagement in one of said grooves, means for hinging said standards below said blocks, a hook pivoted to each of said standards at a distance from the pivot of said standard for holding the standard in engagement with said groove in the block, and notched rods normally engaging said hooks and operable from another side of the vehicle for simultaneously releasing a plurality of said hooks, thereby releasing said standards, substantially as described.

25. An apparatus for maintaining and releasing loads on cars or carts, or other vehicles, comprising a series of blocks each provided with a holding groove and secured to the vehicle-body, a series of rigid standards each adapted to engage in one of said grooves, the said standards being perforated near their lower ends, a substantially U-shaped bolt curved upward at its center and secured to the vehicle-body, and passing through the perforation in the standard, and means for simultaneously releasing a plurality of said standards and allowing them to swing about said U-shaped bolts, substantially as described.

26. An apparatus for maintaining and releasing loads on cars or carts, or other vehicles, comprising a series of blocks each provided with a holding-groove and secured to the vehicle-body, a series of rigid standards each adapted to engage in one of said grooves, the said standards being perforated near their lower ends, a substantially U-shaped bolt curved upward at its center and secured to the vehicle-body, and passing through the perforation in the standard, and means for simultaneously releasing a plurality of said standards and allowing them to swing about said U-shaped bolts, with means located below the platform of the vehicle-body for supporting the free ends of said standards, substantially as described.

27. In an apparatus for maintaining and releasing loads on cars, the combination with the car-body, of a block provided with a holding-groove and secured to the car-body, a rigid standard hinged below said block so as to swing laterally and vertically, the said standard being adapted to swing up into engagement in said groove, means for locking the standard in engagement in said groove, and means for unlocking and releasing said standard, substantially as described.

28. In an apparatus for maintaining and releasing loads on cars, the combination with the car-body, of a block provided with a holding-groove and secured to the car-body, a rigid standard hinged below said block so as to swing laterally and vertically, the said standard being adapted to swing up into engagement in said groove, means for locking the standard in engagement in said groove, and means for unlocking and releasing said standard, with means located beneath the platform of the vehicle for supporting the free end of the standard when released, substantially as described.

29. An apparatus for maintaining and releasing loads on cars, comprising a series of metallic blocks secured to the car-body and each provided with a holding-groove, a series of metal standards each adapted to engage in one of said grooves, means for hinging said standards below said blocks to enable the standard to swing vertically and laterally, means for holding the standards in engagement with said grooves in the blocks, and means operable from another side of the car for simultaneously releasing a plurality of said standards, with means located beneath the platform of the vehicle for supporting the free end of the standard when released, substantially as described.

30. An apparatus for maintaining and releasing loads on cars, comprising a series of blocks secured to the car-body and each provided with a holding-groove, a series of rigid standards each adapted to engage in one of said grooves, the said standards being perforated near their lower ends, and a series of substantially U-shaped bolts curved upward to their center and secured to the car beneath the corresponding blocks, and passing through the perforations in the standards, and means for locking said standards to said blocks and for releasing same and allowing them to swing about said U-shaped bolts, substantially as described.

31. An apparatus for maintaining and releasing loads on cars or carts, or other vehicles, comprising a series of blocks secured to the vehicle-body, beams extending across the car-body and each tying together a pair of oppositely-disposed blocks, a series of rigid standards pivoted below said blocks, means for locking each standard to the corresponding block, and means for simultaneously unlocking and releasing a plurality of said standards, substantially as described.

32. An apparatus for maintaining and releasing loads on cars or carts, or other vehicles, comprising a series of blocks secured to the vehicle-body, beams extending across the car-body and each tying together a pair of oppositely-disposed blocks and provided with outwardly-disposed holding-grooves, a series of rigid standards adapted to swing into engagement with said grooves, means for hinging said standards below said blocks, means for holding the standards in engagement with said grooves, and means for simultaneously releasing a plurality of said standards, substantially as described.

33. An apparatus for maintaining and releasing loads on cars or carts, or other vehicles, comprising a series of metallic blocks provided with vertical grooves and secured to the vehicle-body, metal beams extending across the car-body and each tying together a pair of oppositely-disposed blocks, a series of rigid metal standards adapted to swing into engagement in said grooves, means for hinging said standards below said blocks, means for holding the standard in engagement with said grooves in the blocks, and means for simultaneously releasing a plurality of said standards, substantially as described.

34. An apparatus for maintaining and releasing loads on cars or carts, or other vehicles, comprising a series of metal blocks provided with vertical grooves and secured to the vehicle-body, metal beams extending across the car-body and each tying together a pair of oppositely-disposed blocks, a series of rigid ribbed metal standards adapted to engage closely in said grooves, means for hinging said standards below said blocks to enable the standard to swing outward and laterally, means for holding the standards in engagement with said grooves in the blocks, and means for simultaneously releasing a plurality of said standards, substantially as described.

35. An apparatus for maintaining and releasing loads on cars or carts, or other vehicles, comprising a series of metal blocks provided with vertical grooves and secured to the vehicle-body, metal beams extending across the car-body and each tying together a pair of oppositely-disposed blocks, a series of ribbed metal standards adapted to engage closely in said grooves, means for hinging said standards below said blocks to enable the standard to swing outward and laterally, means for holding the standards in engagement with said grooves in the blocks, and means operable from another side of the vehicle for simultaneously releasing a plurality of said standards, substantially as described.

36. An apparatus for maintaining and releasing loads on cars or carts, or other vehicles, comprising a series of metal blocks provided with vertical grooves secured to the vehicle-body, metal beams extending across the car-body and each tying together a pair of oppositely-disposed blocks, a series of rigid ribbed metal standards adapted to engage in said grooves, means for hinging said standards below said blocks to enable the standard to swing outward and laterally, means for holding the standards in engagement with said grooves in the blocks, and means for simultaneously releasing a plurality of said standards, with means located beneath the platform of the vehicle for supporting the free end of the standard when released, substantially as described.

37. An apparatus for maintaining and releasing loads on cars or carts, or other vehicles, comprising a series of metal blocks provided with vertical grooves secured to the vehicle-body, metal beams extending across the car-body and each tying together a pair of oppositely-disposed blocks, a series of rigid metal standards adapted to engage in said grooves, hooks pivoted to said standards and holding said standards in said grooves, the said standards being perforated near their lower ends, a series of substantially U-shaped bolts secured to the vehicle-body, and each passing through the perforation in a standard, and means for simultaneously releasing a plurality of said standards and allowing them to swing about said U-shaped bolts, substantially as described.

38. An apparatus for maintaining and releasing loads on cars or carts, or other vehicles, comprising a series of metal blocks provided with vertical grooves secured to the vehicle-body, metal beams extending across the car-body and each tying together a pair of oppositely-disposed blocks, a series of metal standards adapted to engage in said grooves, hooks pivoted to said standards and holding said standards in said grooves, the said standards being perforated near their lower ends, a series of substantially U-shaped bolts secured to the vehicle-body, and each passing through the perforation in a standard, and a rotatable notched rod for releasing said hooks, thus simultaneously releasing a plurality of said standards and allowing them to swing about said U-shaped bolts, substantially as described.

39. An apparatus for maintaining and releasing loads on cars or carts, or other vehicles, comprising a series of metal blocks provided with vertical grooves secured to the vehicle-body, metal beams extending across the car-body and each tying together a pair of oppositely-disposed blocks, a series of rigid metal standards adapted to engage in said grooves, the said standards being perforated near the lower ends, a series of substantially U-shaped bolts secured to the vehicle-body, and each passing through the perforation in a standard, and means for simultaneously releasing a plurality of said standards and allowing them to swing about said U-shaped bolts, with means located below the platform of the vehicle-body for supporting the free ends of said standards, substantially as described.

40. An apparatus for maintaining and releasing loads on cars or carts, or other vehicles, comprising a series of metal blocks provided with vertical grooves secured to the vehicle-body, metal beams extending across the car-body and each tying together a pair of oppositely-disposed blocks, a series of metal standards adapted to engage in said grooves, the said standards being perforated near their lower ends, hooks pivoted to said standards, a series of substantially U-shaped bolts secured to the vehicle-body, and each passing through the perforation in a standard, and a notched rod operable from another side of the car for releasing said hooks, thus simultaneously releasing a plurality of said standards and allowing them to swing about said U-shaped bolts, substantially as described.

41. An apparatus for maintaining and releasing loads on cars or carts, or other vehicles, comprising a series of blocks secured to the vehicle-body, and each provided with an outwardly-disposed holding-groove, metal beams extending across the car-body and each tying together a pair of oppositely-disposed blocks, a series of rigid standards each pivoted below said blocks and each adapted to engage in one of said grooves, means for holding the standards in engagement with said grooves in the blocks, and means for simultaneously releasing a plurality of said standards, whereby the said standards are allowed to swing outward about their pivots, substantially as described.

42. An apparatus for maintaining and releasing loads on cars or carts, or other vehicles, comprising a series of blocks secured to the vehicle-body, and each provided with an outwardly-disposed holding-groove, beams extending across the car-body and each tying together a pair of oppositely-disposed blocks, a series of standards each adapted to be swung upward into engagement in one of said grooves, means for hinging said standards below said blocks, a hook pivoted to each of said standards at a distance from the pivot of said standard for holding the standard in engagement with said grooves in the blocks, and means operable from another side of the vehicle for simultaneously releasing a plurality of said hooks, thereby allowing said standards to swing outward, substantially as described.

43. An apparatus for maintaining and releasing loads on cars or carts, or other vehicles, comprising a series of blocks secured to the vehicle-body, and each provided with an outwardly-disposed holding-groove, beams extending across the car-body and each tying together a pair of oppositely-disposed blocks, a series of standards each adapted to be swung upward into engagement in one of said grooves, means for hinging said standards below said blocks, a hook pivoted to each of said standards at a distance from the pivot of said standard for holding the standard in engagement with said groove in the block, and notched rods normally engaging said hooks and operable from another side of the vehicle for simultaneously releasing a plurality of said hooks, thereby releasing said standards, substantially as described.

44. An apparatus for maintaining and releasing loads on cars or carts, or other vehicles, comprising a series of blocks each provided with a holding-groove and secured to the vehicle-body, beams extending across the car-body and each tying together a pair of oppositely-disposed blocks, a series of standards each adapted to engage in one of said grooves, the said standards being perforated near their lower ends, a substantially U-shaped bolt curved upward at its center and secured to the vehicle-body, and passing through the perforation in the standard, and means for simultaneously releasing a plurality of said standards and allowing them to swing about said U-shaped bolts, substantially as described.

45. An apparatus for maintaining and releasing loads on cars or carts, or other vehicles, comprising a series of blocks each provided with a holding-groove and secured to the vehicle-body, beams extending across the car-body and each tying together a pair of oppositely-disposed blocks, a series of standards each adapted to engage in one of said grooves, the said standards being perforated near their lower ends, a substantially U-shaped bolt curved upward at its center and secured to the vehicle-body, and passing through the perforation in the standard, and means for simultaneously releasing a plurality of said standards and allowing them to swing about said U-shaped bolts, with means located below the platform of the vehicle-body for supporting the free ends of said standards, substantially as described.

46. An apparatus for maintaining and releasing loads on cars, comprising a series of metallic blocks secured to the car-body and each provided with a holding-groove, metal beams extending across the car-body and each tying together a pair of oppositely-disposed blocks, a series of metal standards each adapted to engage in one of said grooves, means for hinging said standards below said blocks to enable the standard to swing vertically and laterally, means for holding the standards in engagement with said grooves in the blocks, and means operable from another side of the car for simultaneously releasing a plurality of said standards, with means located beneath the platform of the vehicle for supporting the free end of the standard when released, substantially as described.

47. An apparatus for maintaining and releasing loads on cars or carts, or other vehicles, comprising a series of blocks secured to the vehicle-body, a series of standards pivoted below said blocks, a hook pivoted to each standard for locking same to the corresponding block, and a notched shaft engaging a series of said hooks, with means for turning said shaft, substantially as described.

48. An apparatus for maintaining and releasing loads on cars or carts, or other vehicles, comprising a series of blocks secured to the vehicle-body, a series of standards pivoted below said blocks, a hook pivoted to each standard for locking same to the corresponding block, and a notched shaft engaging a series of said hooks, with means for turning said shaft, said means comprising a worm-gear fast on said shaft, a worm meshing in said gear, with means for turning said worm, substantially as described.

49. An apparatus for maintaining and releasing loads on cars or carts, or other vehicles, comprising a series of blocks secured to the vehicle-body and each provided with a holding-groove, a series of standards adapted to engage in said grooves, means for hinging said standards below said blocks, clevis-shaped hooks pivoted to said standards for holding the standards in engagement with said grooves in the blocks, a notched shaft normally engaging said hooks, and means for rocking said shaft and simultaneously releasing a plurality of said hooks and the standards held thereby, substantially as described.

50. An apparatus for maintaining and releasing loads on cars or carts, or other vehicles, comprising a series of blocks secured to the vehicle-body and each provided with a holding-groove, a series of standards adapted to engage in said grooves, means for hinging said standards below said blocks, clevis-shaped hooks pivoted to said standards for holding the standards in engagement with said grooves in the blocks, a notched shaft normally engaging said hooks, and means for rocking said shaft and simultaneously releasing a plurality of said hooks and the standards held thereby, said means comprising a worm-gear fast on said shaft, a worm meshing in said gear, and means for turning said worm, substantially as described.

Signed at New Orleans, Louisiana, this the 21st day of March, 1906.

GEORGE W. DU BES.

In presence of—
CHAS. R. CURRIE,
JNO. J. WARD.